United States Patent
Enomoto

(10) Patent No.: US 9,842,235 B2
(45) Date of Patent: Dec. 12, 2017

(54) PORTABLE TERMINAL, INFORMATION DISPLAY SYSTEM, INFORMATION DISPLAY METHOD, AND MULTI-TAG

(71) Applicant: BIGLOBE INC., Tokyo (JP)

(72) Inventor: Nobuyuki Enomoto, Tokyo (JP)

(73) Assignee: BIGLOBE Inc. (JP)

(*) Notice: Subject to any disclaimer, the term of this patent is extended or adjusted under 35 U.S.C. 154(b) by 335 days.

(21) Appl. No.: 14/387,795

(22) PCT Filed: Feb. 28, 2013

(86) PCT No.: PCT/JP2013/001226
§ 371 (c)(1),
(2) Date: Sep. 24, 2014

(87) PCT Pub. No.: WO2013/145556
PCT Pub. Date: Oct. 3, 2013

(65) Prior Publication Data
US 2015/0116089 A1    Apr. 30, 2015

(30) Foreign Application Priority Data

Mar. 28, 2012   (JP) ................. 2012-072666

(51) Int. Cl.
G06K 5/00   (2006.01)
G06K 7/10   (2006.01)

(52) U.S. Cl.
CPC ..... G06K 7/10386 (2013.01); G06K 7/10297 (2013.01)

(58) Field of Classification Search
None
See application file for complete search history.

(56) References Cited

U.S. PATENT DOCUMENTS

| | | | |
|---|---|---|---|
| 2007/0159339 A1* | 7/2007 | Matsuura | G06K 19/07749 340/572.8 |
| 2013/0037608 A1* | 2/2013 | Evevsky | G06F 21/31 235/380 |
| 2013/0137413 A1* | 5/2013 | Jayachandran | H04W 8/22 455/418 |

FOREIGN PATENT DOCUMENTS

| | | |
|---|---|---|
| JP | 2003-015941 A | 1/2003 |
| JP | 2004-341757 A | 12/2004 |

(Continued)

OTHER PUBLICATIONS

International Search Report—PCT/JP2013/001226—dated May 28, 2013.

(Continued)

*Primary Examiner* — Joseph Feild
*Assistant Examiner* — John Mortell
(74) *Attorney, Agent, or Firm* — Mark Malek; Stephen Bullock; Widerman Malek, PL

(57) ABSTRACT

A problem is to provide a portable terminal, an information display system, an information display method, and a multi-tag in which two sheets of two-dimensional bar code for download and for individual information data reading need not be installed and hence an installation space can be reduced and a user need not select which bar code is to be read. A processing section (11) of a portable terminal (1) sets a transfer destination for a message of a read-out multi-tag to be a different destination depending on whether a tag reading application (113) has been installed in the own terminal (1).

9 Claims, 12 Drawing Sheets

(56) References Cited

FOREIGN PATENT DOCUMENTS

| JP | 2006-013918 A | 1/2006 |
|---|---|---|
| JP | 2006-243961 A | 9/2006 |
| JP | 2007-305063 A | 11/2007 |
| JP | 2008-225706 A | 9/2008 |
| JP | 4387656 B2 | 12/2009 |

OTHER PUBLICATIONS

Toshinori Kanemoto, "Kinsetsu Musen Tsushin Gijutsa NFC no Kiso Chishiki" Interface, Feb. 28, 2012 (Feb. 28, 2012) (received date), vol. 38, No. 4, pp. 36 to 44 (11 pages).
"Smart Poster Record Type Definition" Technical Specification NFC Forum, SPR 1.1, Jul. 24, 2006 (15 pages).
Nokia Corporation, (Abstract for TW publication No. 200405217), dated Apr. 1, 2004, Taiwan (2 Pages) English.
Nokia Corporation, (Patent for TW publication No. 200405217), dated Mar. 21, 2007, Taiwan (80 Pages) Taiwanese.
Nokia Corporation, (Abstract for CN publication No. 1662920A), dated Aug. 31, 2005, China (1 Page) English.
Nokia Corporation, (Application for CN publication No. 1662920A), dated Aug. 31, 2005, China (52 Page) Chinese.
NTT Data Corp., (Application for JP publication No. 2004-145663), dated May 20, 2004, Japan (1 Page) Japanese.
NTT Data Corp., (Abstract for JP publication No. 2004-145663), dated Oct. 24, 2005, Japan (1 Page) English.
IDS KK, (Abstract for JP publication No. 2007-305063), dated Nov. 22, 2007, Japan (2 Pages) English.
IDS KK, (Application for JP publication No. 2007-305063), dated Nov. 22, 2007, Japan (12 Pages) Japanese.
Liu Tsung-Yu, et al., (Abstract for TW publication No. 200937278) dated Sep. 1, 2009, Taiwan (1 Page) English.
Liu Tsung-Yu, et al., (Application for TW publication No. 200937278) dated Sep. 1, 2009, Taiwan (20 Page) Taiwanese.
Broadcom Corp., (Abstract for TW publication No. 201202735), dated Jan. 16, 2012, Taiwan (2 Pages) English.
Broadcom Corp., (Application for TW publication No. 201202735), dated Jan. 16, 2012, Taiwan (37 Pages) Taiwanese.
TW Intellectual Property Office, (Examination Opinion Notification for TW Patent Application Serial No. 102110430), dated May 28, 2015, Taiwan (7 Pages) English.
TW Intellectual Property Office, (Examination Opinion Notification for TW Patent Application Serial No. 102110430), dated May 28, 2015, Taiwan (11 Pages) Taiwanese.
TW Intellectual Property Office, (Examination Opinion Notification for TW Patent Application Serial No. 102110430), dated May 28, 2015, Taiwan (7 Pages) Japanese.
The State Intellectual Property Office of the People's Republic of China, (Office Action for CN Application No. 201380017684.X), dated Jun. 23, 2016, China (7 Pages) English.
The State Intellectual Property Office of the People's Republic of China, (Office Action for CN Application No. 201380017684.X), dated Jun. 23, 2016, China (9 Pages) Chinese.
The State Intellectual Property Office of the People's Republic of China, (Office Action for CN Application No. 201380017684.X), dated Jun. 23, 2016, China (10 Pages) Japanese.

\* cited by examiner

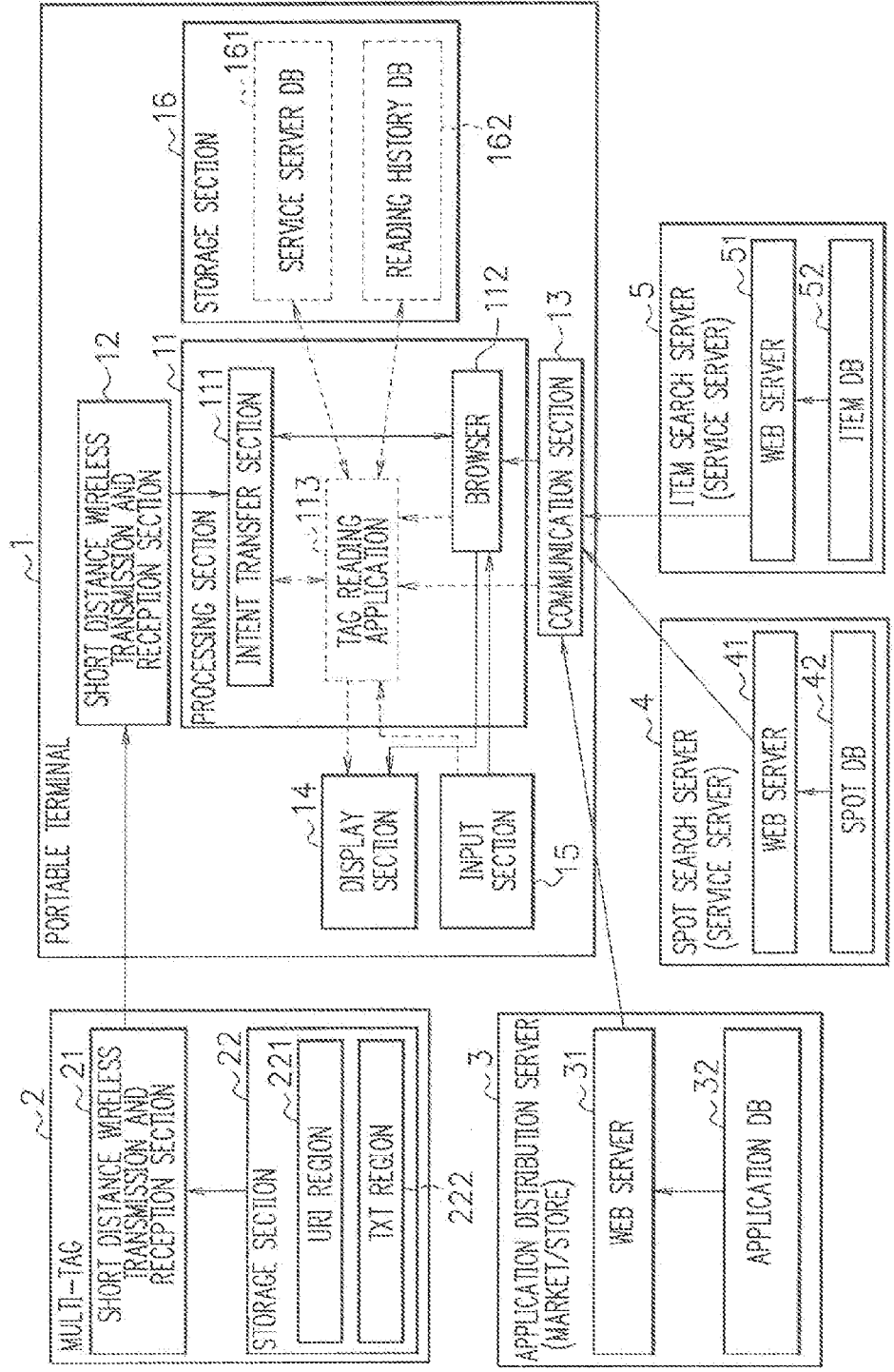
F I G. 1

F I G. 2

| ORDER OF PRIORITY | INTENT NAME | TRANSFER DESTINATION |
|---|---|---|
| 1 | NDEF_DISCOVERED_URI | (default) browser ≫BROWSER 112 |
| 2 | ACTION_VIEW | (default) browser ≫BROWSER 112 |
| 3 | SETTINGS | (default) settings |
| 4 | NDEF_DISCOVERED_ALL | (default) err "TAG TYPE IS UNKNOWN" |

| ORDER OF PRIORITY | INTENT NAME | TRANSFER DESTINATION |
|---|---|---|
| 1 | NDEF_DISCOVERED_URI | jp.ne.biglobe.tagreader<br>※TAG READING APPLICATION 113 |
| 2 | NDEF_DISCOVERED_URI | (default) browser   ※BROWSER 112 |
| 3 | ACTION_VIEW | (default) browser   ※BROWSER 112 |
| 4 | SETTINGS | (default) settings |
| 5 | NDEF_DISCOVERED_ALL | (default) err   "TAG TYPE IS UNKNOWN" | biglobe: REGISTERED TRADEMARK

| SERVICE IDENTIFIER | ACCESS DESTINATION |
|---|---|
| spot | http://location.biglobe.ne.jp |
| item | http://item.biglobe.ne.jp |
|  |  | biglobe: REGISTERED TRADEMARK

F I G. 7

| READING DATE AND TIME | SERVICE IDENTIFIER | ID | NAME | LATITUDE | LONGITUDE | EXPLANATION | IMAGE |
|---|---|---|---|---|---|---|---|
| 20120201-130158 | spot | sjdcajvjeorjgv | OSAKI STATION | +35.6197 | +139.72B553 | A STATION RENEWED WITH REDEVELOPMENT | Osaki.jpg |
| 20120201-140528 | item | lh390rjf90mod3 | POTATO CHIPS SALT TASTE | (null) | (null) | LIGHT SALT POTATO CHIPS | Pchip.jpg |
| | | | | | | | |
| | | | | | | | |
| | | | | | | | |

1621  1622  1623  1624  1625  1626  1627  1628

F I G. 8

| APPLICATION IDENTIFIER | FILE |
|---|---|
| jp.ne.biglobe.tagreader | tagreader.apk |
| | |
| | |
| | | biglobe: REGISTERED TRADEMARK

FIG. 9

| SPOT ID | SPOT NAME | LATITUDE | LONGITUDE | EXPLANATION | IMAGE |
|---|---|---|---|---|---|
| sjdcajfvieorjgv | OSAKI STATION | +35.6197 | +139.728553 | A STATION RENEWED WITH REDEVELOPMENT | Osaki.jpg |
| | | | | | |
| | | | | | |
| | | | | | |

421 / 422 / 423 / 424 / 425 / 426

F I G. 10

| ITEM ID | ITEM NAME | EXPLANATION | IMAGE |
|---|---|---|---|
| 1fn3i9or1j9bmod3 | POTATO CHIPS SALT TASTE | LIGHT SALT POTATO CHIPS | Pchip.jpg |
| | | | |
| | | | |
| | | | |
| | | | |

521 — ITEM ID
522 — ITEM NAME
523 — EXPLANATION
524 — IMAGE

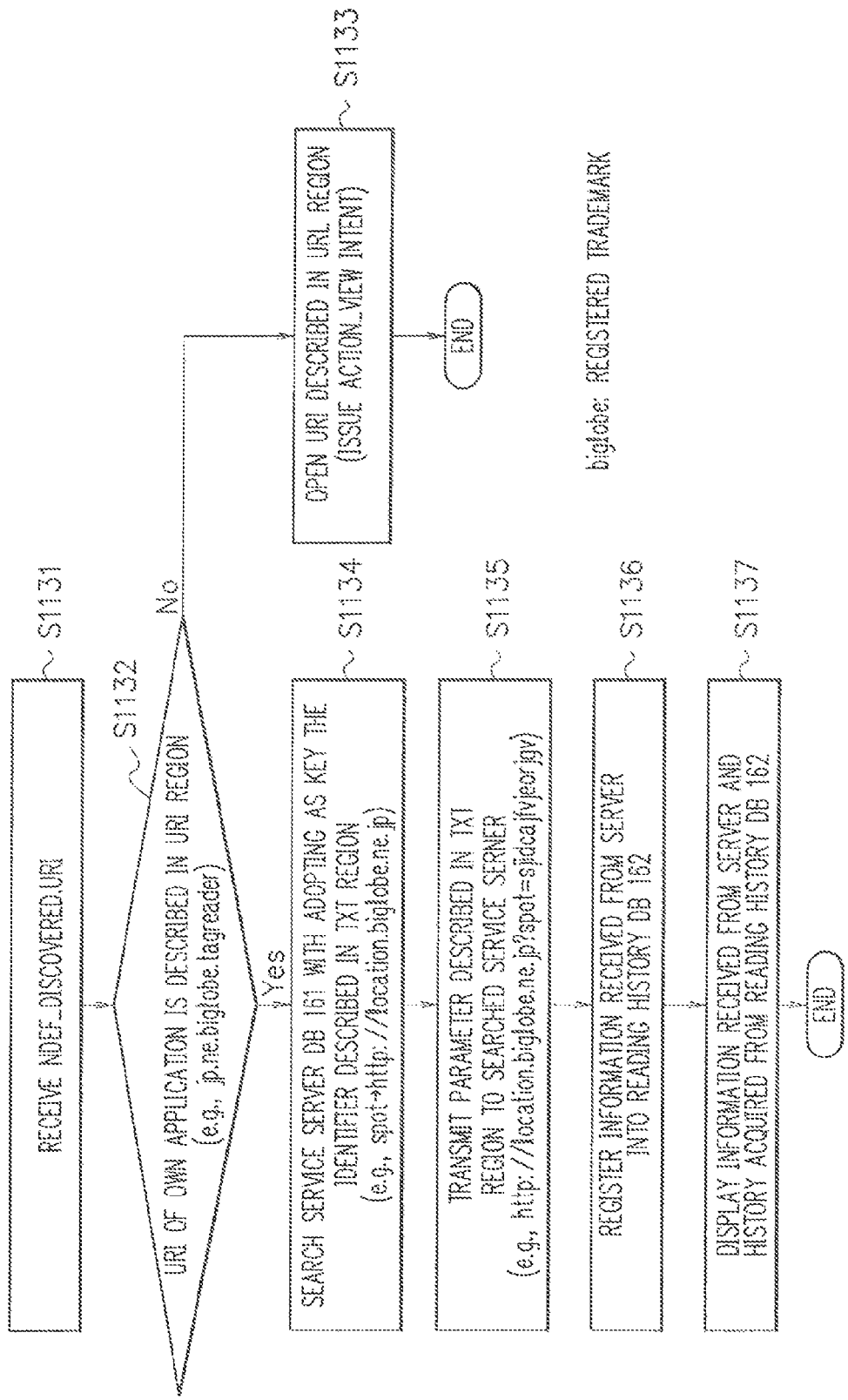

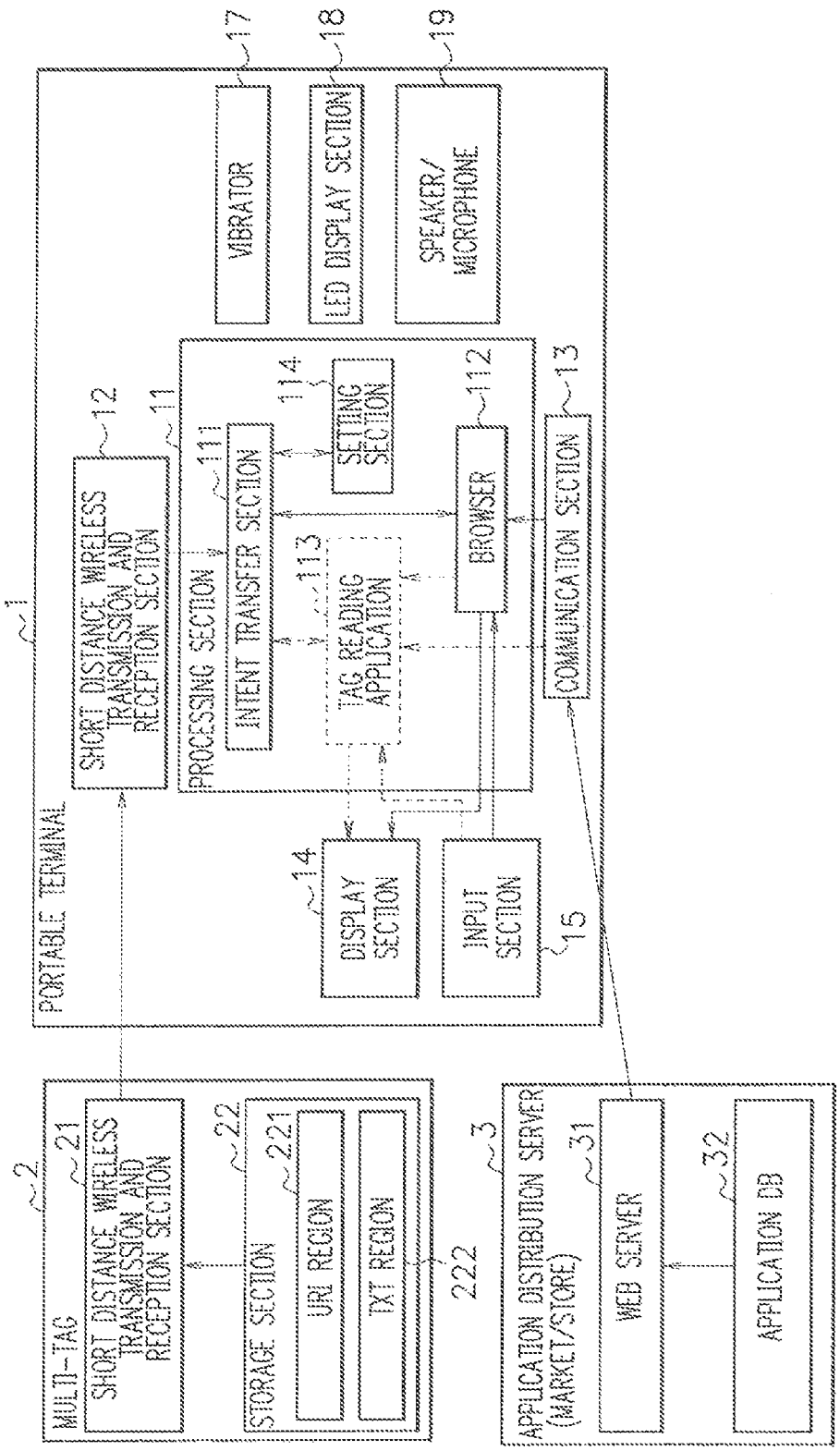

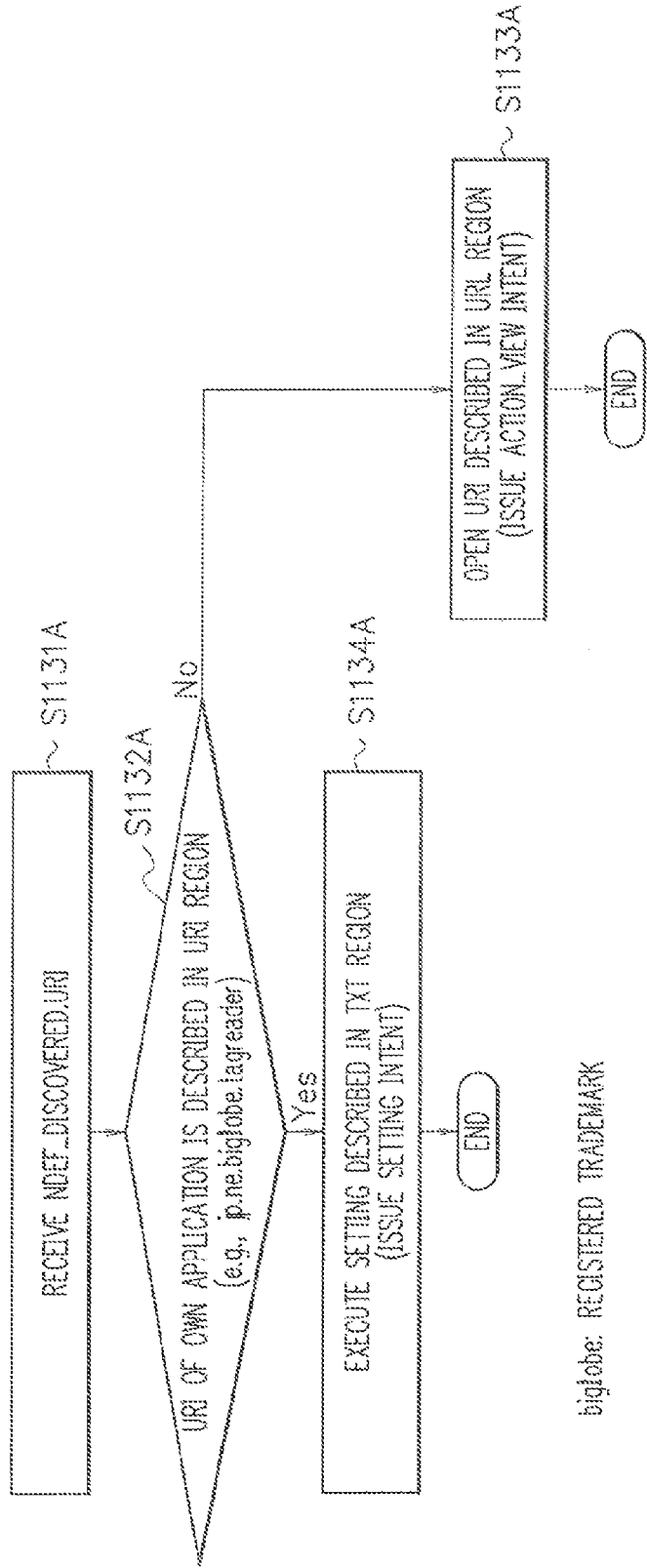

PORTABLE TERMINAL, INFORMATION DISPLAY SYSTEM, INFORMATION DISPLAY METHOD, AND MULTI-TAG

CROSS REFERENCE TO RELATED APPLICATIONS

This is a national stage application under 35 U.S.C. §371 of PCT patent application PCT/JP2013/001226, filed on Feb. 28, 2013, which claims the benefit of JP 2012-072666, filed on Mar. 28, 2012, each of which is hereby incorporated by reference in its entirety except to the extent that any disclosure therein conflicts with any disclosure herein.

TECHNICAL FIELD

The present invention relates to a portable terminal, an information display system, an information display method, and a multi-tag and, in particular, to a technique of reading an NFC (Near Field Communication) tag by using a portable terminal.

BACKGROUND ART

As an example of related art of the present invention, a technique is known that a plurality of two-dimensional bar codes are employed, then dictionary data (corresponding to an application) is downloaded by using one two-dimensional bar code, and then individual information data is read by using another two-dimensional bar code so that translation is performed by using the downloaded dictionary data (see Patent Document 1).

Further, as another example of related art of the present invention, a standard for writing a URI (Uniform Resource Identifier) or a title (a text sentence) into a tag is described (see Non-patent Document 1).

Further, as another example of related art of the present invention, a data part 102 contains: a business operator code indicating a business operator serving as a service provider; a code (an application code) of an application used in cooperation with an IC tag; an application URL serving as a providing source of the application; and other data including the term of validity and the effective zone of the application, the service name, announcement information to the user, and the like. There is a description that such information in the data part 102 serves as "linked application information" (see Patent Document 2).

Further, in this Patent Document 2, it is judged whether a linked application is stored (step S14). There is a description that when a corresponding code is found in this judgment, the procedure goes to step S17.

Further, in this Patent Document 2, when a corresponding code is not present, communication with a business operator server 30 (or any other external server) is performed from a read-out linked application information 102A by using an application URL. There is a description that in the present embodiment, in response to this, the business operator server 30 transmits a corresponding linked application.

Further, in this Patent Document 2, in a case that the terra of validity or the like is specified in an IC tag 10 or in other cases, a saved application table 202 is updated appropriately (step S17). Then, the effective range of a linked application 203 is judged (step S18: effectiveness judgment process). Then, there is a description that the present time is acquired, for example, from a timer (clock means) 28 equipped in advance in a portable terminal 20 and then, when the present time is outside the term of validity, the processing is terminated.

Further, in this Patent Document 2, there is a description that user information necessary for providing the service is acquired (step S20: user information extraction process) and then the user information is transmitted to a predetermined business operator server 30.

Further, as another example of related art of the present invention, there is a description that access information (including an identification information ID) obtained by decrypting a two-dimensional bar code 27b is transmitted to a service server 1 (see Patent Document 3).

Further, as another example of related art of the present invention, a portable phone 2 receives and then acquires a corresponding ID (step S3). Then, there is a description that on the basis of the address of an address administration server 3 stored in advance, the portable phone 2 is connected to the address administration server 3 through a communication section 2D (see Patent Document 4).

Further, as another example of related art of the present invention, a technique of installing a program is described (see Patent Document 5).

PRIOR ART REFERENCE

Patent Document

Patent Document 1: Japanese Laid-Open Patent Publication No. 2004-341757
Patent Document 2: Japanese Laid-Open Patent Publication No. 2008-225706
Patent Document 3: Japanese Laid-Open Patent Publication No, 2006-013918
Patent Document 4: Japanese Laid-Open Patent Publication No. 2006-243961
Patent Document 5: Japanese Laid-Open Patent Publication No. 2003-015941

Non-Patent Document

Non-patent Document 1: Smart Poster Record Type Definition Technical Specification, NFC Forum, SPR 1.1 Jul. 24, 2006.

SUMMARY OF INVENTION

Problems to be Solved by the Invention

Nevertheless in the technique described in Patent Document 1, two sheets of two-dimensional bar code for download and for individual information data reading need be installed. This causes a disadvantage that a large installation space becomes necessary. Further, another disadvantage is present that the user need select which bar code is to be read.

Further, the technique described in Non-patent Document 1 is a technique of writing a URI or a title (a text sentence) into a tag (a white tag) in which no data is written. The configuration of this tag is completely different from the present invention.

Further, the technique described in Patent Document 2 lacks the description of a feature of the present invention that when a tag reading application has been installed, the text contained in a message read from the tag is transmitted to a second access destination stored in the storage section and setting of the terminal is performed on the basis of the text contained in the message read from the tag.

Further, in the technique described in Patent Document 2, when a linked application has been found, the linked application is started, then transmits user information, or determines whether processing is to be performed in accordance with the term of validity or the like. Nevertheless, the technique described in Patent Document 2 is different from the technique of transmitting the text contained in the message read from a tag of the present invention, to a second access destination stored in the storage section or alternatively the technique of setting up the terminal on the basis of the text contained in the message read from the tag.

Further, in the technique described in Patent Document 3, the access information is transmitted to a service server described in the two-dimensional bar code. In contrast, in the present invention, the text contained in the message read from a tag is transmitted to a second access destination (different from the URI of the application distribution server) stored in the storage section. That is, the techniques of the present invention and Patent Document 3 are mutually different in the transmission destination for the information.

Thus, even when the technique described in Patent Document 2 and the technique described in Patent Document 3 are combined with each other, it is difficult to reach and devise the present invention.

Further, the technique described in Patent Document 4 relates to processing prior to installation of a program. Thus, even when the technique described in Patent Document 2 and the technique described in Patent Document 4 are combined with each other, it is difficult to reach and devise the present invention.

Further, the technique described in Patent Document 5 describes program installation alone and hence does not describe the features of the present invention at all.

Thus, an object of the present invention, is to provide a portable terminal, an information display system, an information display method, and a multi-tag in which two sheets of two-dimensional bar code for download and for individual information data reading need not be installed and hence an installation space can be reduced and a user need not select which bar code is to be read.

Means for Solving to the Problems

In order to resolve the above-mentioned problem, the portable terminal according to the present invention is characterized in that a transfer destination for a message of a read-out multi-tag is set to be a different destination depending on whether a tag reading application has been installed in the own terminal.

The information display system according to the present invention is characterized by comprising: a multi-tag; and a portable terminal in which a transfer destination for a message of a read-out multi-tag is set to be a different destination depending on whether a tag reading application has been installed in the own terminal.

The information display method of a portable terminal according to the present invention is characterized in that a transfer destination for a message of a read-out multi-tag is set to be a different destination depending on whether a tag reading application has been installed in the own terminal.

The multi-tag according to the present invention is characterized by including: a URI region for recording a uniform resource identifier (URI) identifying a server resource or the like; and a text region, describing a service identifier and a parameter necessary for a service.

Further, the program of information display method according to the present invention is characterized by causing a computer of a portable terminal to execute a step of, depending on whether a tag reading application has been installed in the own terminal, setting to be a different destination a transfer destination for a message of a read-out multi-tag.

Advantageous Effects of the Invention

According to the present invention, an effect is obtained that two sheets of two-dimensional bar code for download and for individual information data reading need not be installed and hence an installation space can be reduced and a user need not select which bar code is to be read.

BRIEF DESCRIPTION OF THE DRAWINGS

FIG. 1 A block diagram of an installation automatic guiding system according to a first embodiment of the present invention.

FIG. 2 A diagram showing a setting situation of an intent transfer section 111 at a time point prior to installation of a tag reading application 113.

FIG. 3 A diagram showing a setting situation of an intent transfer section 111 at a time point posterior to installation of a tag reading application 113.

FIG. 7 A diagram showing a configuration of a reading history DB 162.

FIG. 8 A diagram showing a configuration of an application DB 32.

FIG. 9 A diagram showing a configuration of a spot DB 42.

FIG. 10 A diagram showing a configuration of an item DB 52.

FIG. 11 A flow chart showing processing of a tag reading application 113 in a processing section 11.

FIG. 12 A block diagram of an installation automatic guiding system according to a second embodiment of the present invention.

FIG. 13 A flow chart showing processing of a tag reading application 113A in a processing section 11.

DESCRIPTION OF THE EMBODIMENTS

Figure 4:
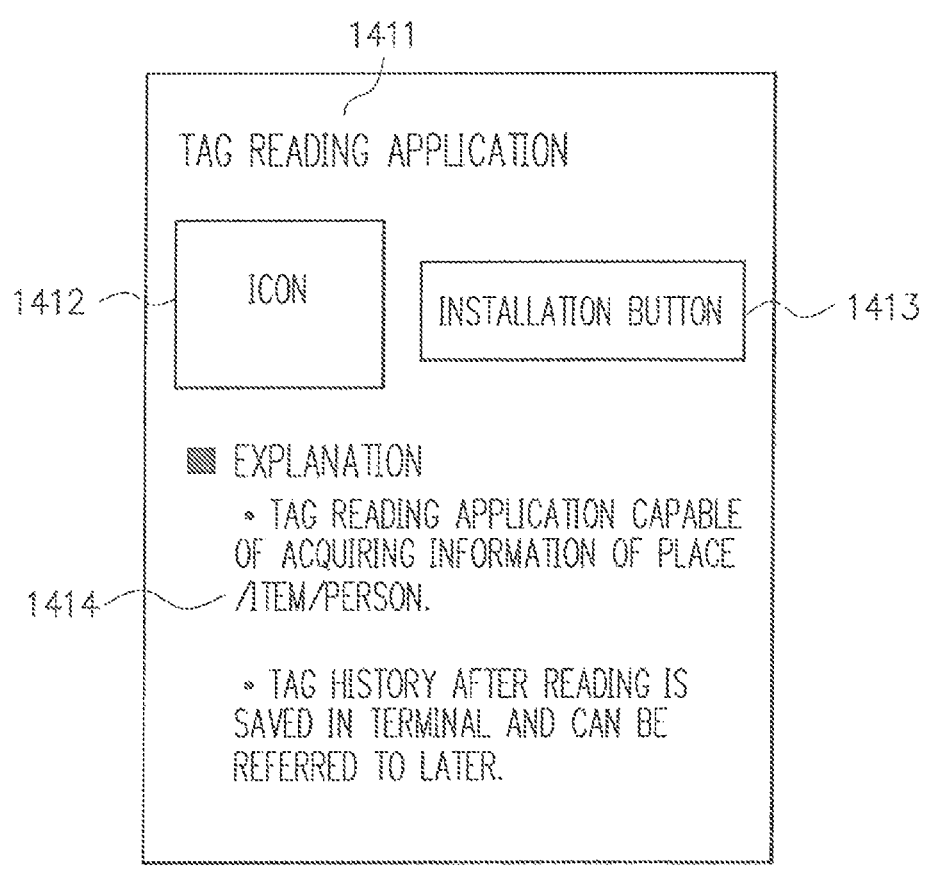
FIG. 4 A diagram showing an installation screen 141 displayed on a display section 14 when a multi-tag 2 is read by using a portable terminal 1 at a time point prior to installation of a tag reading application 113.

Before explanation of the embodiments, the present invention are outlined here. In the present invention, when a multi-tag has been read by using a portable terminal, on the basis of setting, an intent transfer section determines whether a read-out URI is to be transferred to a browser or to a tag reading application. When an identifier indicating a tag reading application is contained in a part of the received URI message, on the basis of the contents described in a TXT message, the tag reading application selects a service server and then obtains necessary information.

First Embodiment

In a first embodiment, the terminal side is constructed capable of automatically distinguishing the necessity of download at the time of tag reading. Then, on the basis of the contents written in the tag, guiding to an appropriate service server is performed.

FIG. 1 is a block diagram of an installation automatic guiding system according to the first embodiment of the present invention. An information display system according to the first embodiment of the present invention is described below with reference to FIG. 1. The information display system according to the present embodiment includes a portable terminal 1, a multi-tag 2, an application distribution server 3, a spot search server 4, and an item search server 5.

The portable terminal 1 includes a processing section 11, a short distance wireless transmission and reception section 12, a communication section 13, a display section 14, an input section 15, and a storage section 16. Specific examples of the portable terminal 1 include a smart phone (high-performance portable telephone) and a tablet terminal.

The processing section 11 is a section for executing and processing application software so as to perform instruction to the short distance wireless transmission and reception section 12, the communication section 13, the display section 14, the input section 15, and the storage section 16. The processing section 11 includes an intent transfer section 111, a browser 112, and a tag reading application 113.

The intent transfer section 111 is a section for transferring a notification (an intent) exchanged between the short distance wireless transmission and reception section 12 the browser 112 or the tag reading application 113. On the basis of the name imparted to the received intent, the intent transfer section 111 searches an internal table so as to determine a transfer destination.

The browser 112 requests an HTML (Hyper Text Markup Language) file, an image file, and an application (an apk file or the like) through the communication section 13 to the WEB server of the URL instructed by the input section 15 or the intent transfer section 111, then displays through the display section 14 the HTML file and the image file having been received, and further installs the received application.

The tag reading application 113 receives from the intent transfer section 111 a URI and a TXT message described in the multi-tag 2, then searches a service server DB 161 with adopting as a key the contents described in the URI and the TXT having been received so as to determine a server with which communication is to be performed, then acquires data from the spot search server 4 or the item search server 5 through the communication section 13, and then displays the acquired data or the like on the display section 14. Further, depending on the contents described in the URI and the TXT having been received, displaying of the website of the URI is requested to the browser 112 through the intent transfer section 111.

Further, the identifier described in the URI and the TXT received, from the intent transfer section 111 and the data acquired from the spot search server 4 or the item search server 5 through the communication section 13 are saved into a reading history DB 162. When user operation is performed through the input section 15, the contents saved in the reading history DB 162 is read from the reading history DB 162 and then displayed through the display section 14. Here, the tag reading application 113 is installed in the form of an application through the browser 112.

The short distance wireless transmission and reception section 12 is a section for performing communication with the short distance wireless transmission and reception section 21 in the multi-tag 2 so as to write data into the storage section 22 in the multi-tag 2 or read data from the storage section 22 in the multi-tag 2. Specifically, NFC (Near Field Communication) is used in this communication.

The communication section 13 performs communication with the Internet so as to allow the processing section 11 to perform communication with the application distribution server 3, the spot search server 4, the item search server 5, and the like through the Internet. The display section 14 is a section for displaying the contents instructed by the browses 112 or the tag reading application 113 in the processing section 11.

The input section 15 is a section for receiving input from the user and then transferring the input contents to the browser 112 or the tag reading application 113 in the processing section 11. In a smart phone or a tablet terminal, the input section 15 is realized as a touch panel together with the display section 14.

The storage section 16 is a section into which contents instructed by the processing section 11 is stored and from which contents instructed by the processing section 11 is read. Ordinarily, a hard disc or a nonvolatile memory such as a flash memory is employed. Instead, a volatile memory such as a RAM memory may be employed for implementation.

The storage section 16 includes a service server DB 161 and a reading history DB 162. The service server DB 161 is a database for returning an access destination URL corresponding to a service identifier. This result is used in the tag reading application 113 in order to determine a service server of access destination.

The reading history DB 162 is a database for returning a service identifier, an ID, a name, a latitude, a longitude, an explanation, and an image corresponding to the reading date and time of a multi-tag. This result is used in the tag reading application 113 in order to display the reading history.

The multi-tag 2 includes a short distance wireless transmission and reception section 21 and a storage section 22. Specific examples of the multi-tag 2 include an NFC tag formatted in NDEF Smart Poster form.

The short distance wireless transmission and reception section 21 performs communication with the short distance wireless transmission and reception section 12 in the portable terminal 1, then writes data into the storage section 22 on the basis of the received command, and further transmits a result of reading of data from the storage section 22. Specifically, NFC (Near Field Communication) is used in this communication.

The storage section 22 is a flash memory (a nonvolatile memory) formatted in NDEF Smart Poster form and includes a URI region 221 and a TXT region 222.

The URI region 221 is a region into which a uniform resource identifier (URI) for identifying a server resource or the like set forth in RFC3986 or the like is recorded.

According to the NDEF Smart Poster standard, the TXT region 222 is a region into winch an explanation text of the server described in the URI region 221 is recorded. Nevertheless, in the present application, a service identifier and a parameter necessary for a service are described in this region.

The application distribution server 3 is a server for distributing application and includes a WEB server 31 and an application DB 32. In general, this server is referred to as a market or a store.

In response to a contents acquisition request arriving from the portable terminal 1 through the Internet, the WEB server 31 extracts from the application DB 32 the contents corresponding to the application identifier (e.g., jp.ne.biglobe (registered trademark).tagreader) presented in the request, and then transmits the contents through the Internet to the portable terminal 1.

The application DB 32 is a database for returning an installation package file (an apk file) corresponding to the application identifier.

The spot search server 4 is a server for searching a spot name, a latitude, a longitude, an explanation, and an image corresponding to a spot ID and includes a WEB server 41 and a spot DB 42.

In response to a contents acquisition request arriving from the portable terminal 1 through the Internet, the WEB server 41 extracts from the spot DB 42 the spot name, the latitude, the longitude, the explanation, and the image corresponding to the spot ID presented in the request, and then transmits the data through the Internet to the portable terminal 1.

The spot DB 42 is a database for returning a spot name, a latitude, a longitude, an explanation, and an image corresponding to a spot ID. The item search server 5 is a server for searching an item name, an explanation, and an image corresponding to an item ID and includes a WEB server 51 and an item DB 52.

In response to a contents acquisition request arriving from the portable terminal 1 through the Internet, the WEB server 51 extracts from the item DB 52 the item name, the explanation, and the image corresponding to the item ID presented in the request, and then transmits the data through the Internet to the portable terminal 1. The item DB 52 is a database for returning an item name, an explanation, and an image corresponding to the item ID.

FIG. 2 is a diagram showing a selling situation of the Intent transfer section 111 at a time point prior to installation of the tag reading application 113. The intent transfer section 111 is constructed from order of priority 1111, an intent name 1112, and a transfer destination 113.

The order of priority 1111 is a region indicating the order of priority of setting, where a lower numeric value indicates a higher priority. The intent name 1112 is a region in which the name of a notification (an intent) serving as a setting object is described. The transfer destination 1113 is a region in which a transfer destination (an application or the like) to which the intent of the name described in the intent name 1112 is to be transferred is specified.

FIG. 3 is a diagram showing a setting situation of the intent transfer section 111 at a time point posterior to installation of the tag reading application 113. The configuration of the intent transfer section 111 is similar to that of FIG. 2.

FIG. 4 is a diagram showing an installation screen 141 displayed on the display section 14 when the multi-tag 2 is read by using the portable terminal 1 at a time point prior to installation of the tag reading application 113.

The title 1411 is a region in which the name of an application whose installation is to be started is displayed. In this example, "Tag Reading Application" is displayed. The icon 1412 is a region in which the icon of the application whose installation is to be started is displayed.

The installation button 1413 is a button for starting installation. When the button is pressed down, an installation package file is transferred from the application distribution server to the portable terminal 1 and then installed in the processing section 11 of the portable terminal 1. An explanation 1414 is a region, in which the explanation of the application whose installation is to be started is described.

Figures 5, 6:
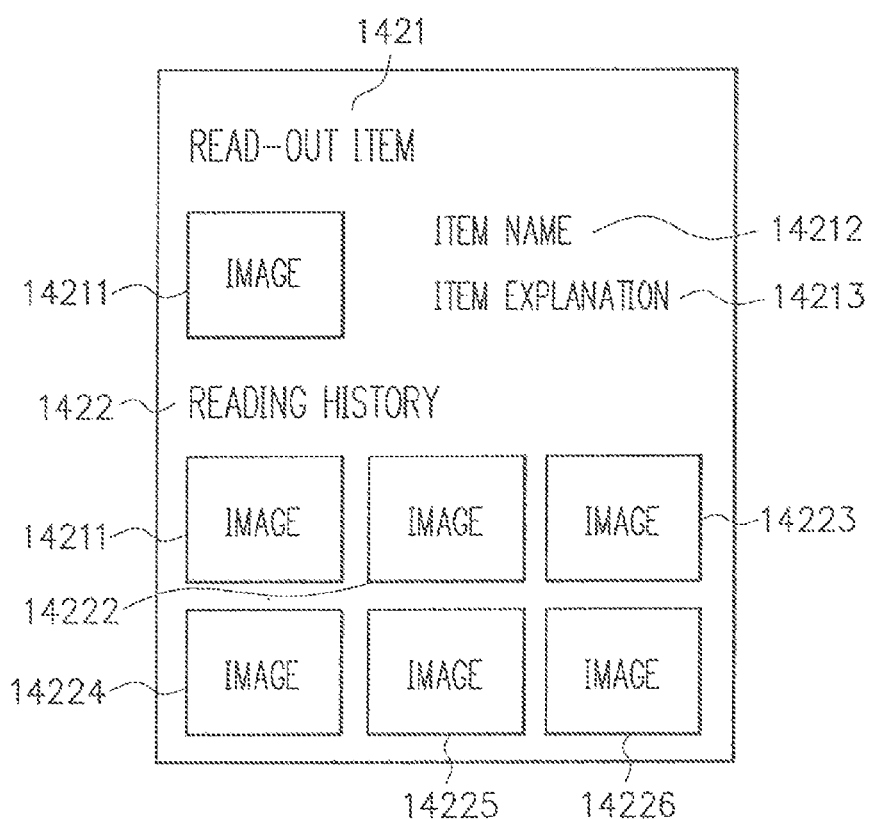
FIG. 5 A diagram showing an item search result screen 142 displayed on a display section 14 when a multi-tag 2 in which an item ID is described in an TXT region is read by using a portable terminal 1 at a time point posterior to installation of a tag reading application 113.
FIG. 6 A diagram showing a configuration of a service server DB 161.

FIG. 5 is a diagram showing an item search result screen 142 displayed on the display section 14 when the multi-tag 2 in which an item ID is described in the TXT region is read by using the portable terminal 1 at a time point posterior to installation of the tag reading application 113.

The read-out item 1421 is a region in which the contents of an item corresponding to the item ID described in the TXT region 222 in the multi-tag 2 is displayed. The image 14211 is a region in which the image of the item is displayed. The item name 14212 is a region in which the name of the item is displayed. The item explanation 14213 is a region, in which the explanation of the item is displayed.

The reading history 1422 is a region in which the history of items read in the past is displayed in descending order of reading date and time. The image 14221 is a region in which the image of an item read most recently among the items read in the past is displayed. The images 14222 to 14226 are regions in which the images of items read in the past are displayed similarly to the image 14221.

FIG. 6 is a diagram showing the configuration of the service server DB 161. The service server DB 161 is constructed from a service identifier 1611 and an access destination 1612. The service identifier 1611 is a region into which an identifier for identifying a service type is stored. The access destination 1612 is a region in which the URI of a server or the like for providing the service set forth in the service identifier 1611 is described.

FIG. 7 is a diagram showing the configuration of the reading history DB 162. The reading history DB 162 is constructed from a reading date and time 1621, a service identifier 1622, an ID 1623, a name 1624, a latitude 1625, a longitude 1626, an explanation 1627, and an image 1628.

The reading date and time 1621 is a region in which the date and time when the multi-tag 2 was read is described. The service identifier 1622 is a region in which the identifier described in the TXT region of the read-out multi-tag 2 is described.

The ID 1623 is a region in which the item ID or the spot ID described after the identifier described in the TXT region of the read-out multi-tag 2 is described. The name 1624 is a region in which the name of an item corresponding to the item ID or the name of a spot corresponding to the spot ID is described.

The latitude 1625 is a region into which, when the read-out multi-tag 2 indicates a spot, the latitude of the place corresponding to the spot ID is recorded. The longitude 1626 is a region into which, when the read-out multi-tag 2 indicates a spot, the longitude of the place corresponding to the spot ID is recorded.

The explanation 1627 is a region in which the explanation of an item corresponding to the item ID or the explanation of a spot corresponding to the spot ID is described. The image 1628 is a region in which the file name of a photograph of the item corresponding to the item ID or a photograph of the spot corresponding to the spot ID is described.

FIG. 8 is a diagram showing the configuration of the application DB 32. The application DB 32 is constructed from an application identifier 321 and a file 322. The application identifier 321 is a region into which an identifier for identifying an application is stored. The file 322 is a region in which the file name of an installation package (apk) for installing the application is described.

FIG. 9 is a diagram showing the configuration of the spot DB 42. The spot DB 42 is constructed from a spot ID 421, a spot name 422, a latitude 423, a longitude 424, an explanation 425, and an image 426.

The spot ID 421 is a region in which a spot ID is described. This region serves as a search key at the time of searching the spot DB 42. The spot name 422 is a region in which the name of a spot corresponding to the spot ID described. The latitude 423 is a region into which the latitude of the place corresponding to the spot ID is recorded. The longitude 424 is a region into which the longitude of the place corresponding to the spot ID is recorded.

The explanation 425 is a region in which the explanation of the spot corresponding to the spot ID described. The image 426 is a region in which the file name of a photograph of the spot corresponding to the spot ID is described.

FIG. 10 is a diagram showing the configuration of the item DB 52. The item DB 52 is constructed from an item ID 521, an stem name 522, an explanation 523, and an image 524. The Item ID 521 is a region in which an item ID is described. This region serves as a search key at the time of searching the item DB 52.

The item name 522 is a region in which the name of an item corresponding to the item ID is described. The explanation 523 is a region in which the explanation of the item corresponding to the item ID is described. The image 524 is a region in which the file name of a photograph of the item corresponding to the item ID is described.

FIG. 11 is a flow chart showing processing of the tag reading application 113 in the processing section 11. When receiving an NDEF_DISCOVERED.URI intent from the intent transfer section 111, the tag reading application 113 starts processing. This intent contains a URI message (e.g., http://market.biglobe(registered trademark).jp/?id=jp.ne.biglobe(registered trademark).tagreader) and a TXT message (e.g., spot=sjidcajfvjeorjgv) (step S1131).

When, in the URI message of the intent acquired at step S1131, a download URI containing the application identifier of the own application is described (step S1132: Yes), the procedure goes to step S1134. When a download URI containing the application identifier of the own application is not described (step S1132: No), the procedure goes to step S1133. For example, in a case that the application identifier of the tag reading application 113 is jp.ne.biglobe(registered trademark).tagreader, when the character string of this application identifier is contained in the URI message, the procedure goes to step S1134. When the character string is not contained, the procedure goes to step S1133 (step S1132).

An ACTION_VIEW intent is transmitted to the intent transfer section so that the browser 112 is requested to open the URI described, in the URI message (step S1133).

The service server DB 161 is searched with adopting as a key the identifier described in the TXT region. For example, when a character string "spot=sjsdcajfvjeorjgv" is described in the TXT region, the service server DB 161 is searched with adopting the identifier "spot" as a key so that the URI (e.g., http://location.biglobe(registered trademark).ne.jp) of a service server is acquired (step S1134).

A parameter described in the TXT message is transmitted to the service server acquired at step S1134. For example, at step S1134, when a reply indicating a service server http://location.biglobe(registered trademark).ne.jp is obtained, a GET command http://location.biglobe(registered trademark).ne.jp?spot=sjidcajfvjeorjgv is transmitted (step S1135).

A reply to the parameter (GET command) transmitted at step S1135 is received and then the received contents are recorded into the reading history DB 162 (step S1136). The contents received from the service server at step S1136 and images (icons) corresponding to the history described in the top six records of the result of search of the reading history DB 162 in descending order of registration date are displayed on the display section 14 in the form of the item search result screen 142 (step S1137).

An information display method using the present system is described below in detail with reference to FIG. 1.

Implementation Example 1: Installation Operation for Tag Reading Application 113

Implementation Example 1 describes the operation that when the multi-tag 2 in which an item ID is described in the TXT region has been read by using the portable terminal 1 at a time point prior to Installation of the tag reading application 113, the tag reading application 113 is installed.

In this example, it is premised that the application identifier of the tag reading application 113 is jp.ne.biglobe (registered trademark).tagreader. In the portable terminal 1, it is premised that the tag reading application 113 is not installed and that setting in the intent transfer section 111 is as shown in FIG. 2. Further, it is premised that the download URI of the tag reading application 113 (http://market.biglobe(registered trademark).jp/?id=jp.ne.biglobe(registered trademark).tagreader) is set up in the URI region 221 in the multi-tag 2 and "item=1fh3i90rjf90mod3" is set up in the TXT region 222.

It is premised that the contents shown in FIG. 8 are set up in the application DB 32. It is premised that the contents shown in FIG. 9 are set up in the spot DB 42. It is premised that the contents shown in FIG. 10 are set up in the item DB 52.

It is premised that a URL http://market.biglobe(registered trademark).jp is set up in the application distribution server 3. It is premised that a URL http://location.biglobe(registered trademark).ne.jp is set up in the spot search server 4. It is premised that a URL http://item.biglobe(registered trademark).ne.jp is set up in the item search server 5.

When the multi-tag 2 is held over the portable terminal 1 so that communication is established between the short distance wireless transmission and reception section 12 in the portable terminal 1 and the short distance wireless transmission and reception section 21 in the multi-tag 2, the short distance wireless transmission and reception section 12 in the portable terminal 1 requests to the short distance wireless transmission and reception section 21 in the multi-tag 2 for transmission of the contents recorded in the storage section 22.

In response to the request from the short distance wireless transmission and reception section 12, the short distance wireless transmission and reception section 21 transmits to the short distance wireless transmission and reception section 12 the contents described in the URI region 221 and the TXT region 222 in the storage section 22. In this example, "http://market.biglobe(registered trademark).jp/?id=jp.ne.biglobe(registered trademark).tagreader" is transmitted as a URI and "item=1fh3i90rjf90mod3" is transmitted, as a TXT.

The short distance wireless transmission and reception section 12 transmits the URI and the TXT received from the short distance wireless transmission and reception section 21, as an NDEF_DISCOVERED.URI intent to the intent transfer section 111.

On receiving the NDEF_DISCOVERED.URI intent from the short distance wireless transmission and reception section 12, the intent transfer section 111 refers to the setting shown in FIG. 2 so as to determine a transfer destination for the intent. In this example, in accordance with the setting the received NDEF_DISCOVERED.URI intent is transferred to the browser.

The browser 112 receives the NDEF_DISCOVERED.URI intent from the intent transfer section 111 and then accesses through the communication section 13 to the server of URI (http://market.biglobe(registered trademark).jp/?id=jp.ne.biglobe(registered trademark).tagreader) contained in the intent.

When receiving the URI (http://market.biglobe(registered trademark).jp/?id=jp.ne.biglobe(registered trademark).tagreader) from the browser 112, the communication section 13 is connected to the server corresponding to http://market.biglobe(registered trademark).jp/ through the Internet. In this example, the communication section 13 is connected to the application distribution server 3.

The WEB server 31 in the application distribution server 3 receives the request (http://market.biglobe(registered trademark).jp/?id=jp.ne.biglobe(registered trademark).tagreader) from the communication section 13 in the portable terminal 1 and then searches the application DB 32 with adapting as a key jp.ne.biglobe(registered trademark).tagreader. Them the WEB server 31 receives tagreader.apk as a search result and then transmits the tagreader.apk file through the communication section 13 to the browser 112.

The browser 112 receives the tagreader.apk file from the WEB server 31 through the Internet and the communication section 13. At that time, since the extension of the file is apk, the received file is recognized as an installation package file and hence the received file is installed. As a result, the tag reading application 113 is installed in the processing section 11.

When detecting the completion of the tag reading application 113 installation, the browser 112 starts the tag reading application 113.

The tag reading application 113 is started in a first-time startup mode and then sets up the intent transfer section 111 such as to transfer an NDEF_DISCOVERED.URI intent to the own application. As a result, the setting situation shown in FIG. 3 is realized. Further, the service server DB 161 is generated in the storage section 16 and then setting of the service identifier and the access destination shown in FIG. 6 are performed. Further, the reading history DB 162 is generated in the storage section 16.

As a result, installation of the tag reading application 113 is completed. Here, as described above, in the installation operation for the tag reading application 113, "item=1fh3i90rjf90mod3" described in the TXT region is ignored as a result.

Implementation Example 2: Item Display Operation

Implementation Example 2 describes the operation that when the multi-tag 2 in which an item ID is described in the TXT region is read by using the portable terminal 1 at a time point posterior to installation of the tag reading application 113, an item corresponding to the item ID described in the multi-tag 2 is displayed.

In this example, it is premised that the application identifier of the tag reading application 113 is jp.ne.biglobe (registered trademark).tagreader. In the portable terminal 1, it is premised that the tag reading application 113 is already installed and that setting in the intent transfer section 111 is as shown in FIG. 3.

Further, it is premised that the download URI of the tag reading application 113 (http://market.biglobe(registered trademark).jp/?id=jp.ne.biglobe(registered trademark).tagreader) is set up in the URI region 221 in the multi-tag 2 and "item=1fh3i90rjf90mod3" is set up in the TXT region 222.

It is premised that the contents shown in FIG. 8 are set up in the application DB 32. It is premised that the contests shown in FIG. 9 are set up in the spot DB 42. It is premised that the contents shown in FIG. 10 are set up in the item DB 52. It is premised that the multi-tag 2 is stuck on "Potato Chips Salt Taste".

It is premised that a URL http://market.biglobe(registered trademark).jp is set up in the application distribution server 3. It is premised that a URL http://location.biglobe(registered trademark).ne.jp is set up in the spot search server 4. It is premised that a URL http://item.biglobe(registered trademark).ne.jp is set up in the item search server 5.

Further, it is premised that a "history that a tag identified by spot ID=sjidcajfvjeorjgv was read at 13:01:58 on Feb. 1, 2012" is already saved in the reading history DB 162.

When the portable terminal 1 is held over the multi-tag 2 stuck on the "Potato Chips Salt Taste" so that communication is established between the short distance wireless transmission and reception section 12. In the portable terminal 1 and the short distance wireless transmission and reception section 21 in the multi-tag 2, the short distance wireless transmission and reception section 12 in the portable terminal 1 requests to the short distance wireless transmission and reception section 21 in the multi-tag 2 for transmission of the contents recorded in the storage section 22.

In response to the request from the short distance wireless transmission and reception section 12, the short distance wireless transmission and reception section 21 transmits to the short distance wireless transmission and reception section 12 the contents described in the URI region 221 and the TXT region 222 in the storage section 22. In this example, "http://market.biglobe(registered trademark).jp/?id=jp.ne.biglobe(registered trademark).tagreader" is transmitted as a URI and "item=1fh3i90rjf90mod3" is transmitted as a TXT.

The short distance wireless transmission and reception section 12 transmits the URI and the TXT received from the short distance wireless transmission and reception section 21, as an NDEF_DISCOVERED.URI intent to the intent transfer section 111.

On receiving the NDEF_DISCOVERED.URI intent from the short distance wireless transmission and reception section 12, the intent transfer section 111 refers to the setting shown in FIG. 3 so as to determine a transfer destination for the intent. In this example, in accordance with the setting, the received NDEF_DISCOVERED.URI intent is transferred to the tag reading application 113. When receiving the NDEF_DISCOVERED.URI intent from the intent transfer section 111, the tag reading application 113 starts processing.

In the URI message of the intent acquired at step S1131, a download URI (http://market.biglobe(registered trademark).jp/?id=jp.ne.biglobe(registered trademark).tagreader) containing the application identifier (jp.ne.biglobe(registered trademark).tagreader) of the own application is described. Thus, the tag reading application 113 searches the service server DB 161 with adopting as a key the identifier described in the TXT region.

In this example, "item=1fh3i90rjf90mod3" is set up in the TXT region. Thus, the service server DB 161 is searched with adopting "item" as a key so that "http://item.biglobe (registered trademark).ne.jp" is acquired as a result.

The tag reading application 113 transmits a GET command http://item.biglobe(registered trademark).ne.jp?item=1fh3i90rjf90mod3 through the communication section 13 to the WEB server 51 in the item search server 5 which is a server corresponding to http://item.biglobe(registered trademark).ne.jp.

The WEB server 51 in application search server 5 receives the request (http://item.biglobe(registered trademark)

.ne.jp?item=1fh3i90rjf90mod3) from the communication section 13 in the portable terminal 1 and then searches the item DB 52 with adopting 1fh3i90rjf90mod3 as a key. Then, as a search result, the item name "Potato Chips Salt Taste", the explanation "light salt chips", and the image "Pchip.jpg" are acquired. Then, the search result is transmitted to the tag reading application 113 (at that time, the image file Pchip.jpg is also transmitted).

The tag reading application 113 receives the reply from the WEB server 51 and then records the received contents into the reading history DB 162. In this example, "20120201-140526" is registered into the reading date and time 1621, "Item" into the service identifier 1622, "1fh3i90rjf90mod3" into the ID 1623, "Potato Chips Salt Taste" into the name 1624, null into the latitude 1625, null into the longitude 1626, "light salt chips" into the explanation 1627, and "Pchip.jpg" into the image 1628.

The tag reading application 113 displays the contents received from the WEB server 51 and the result of search of the reading history DB 162 in descending order of registration date onto the display section 14 in the form of the item search result screen 142. In this example, "Pchip.jpg" is displayed an the image 14211, "Potato Chips Salt Taste" in the item name 14212, and "light salt chips" in the item explanation 14213.

Further, as a result of search of the reading history DB 162, a "history that a tag identified by spot ID=sjidcajfvjeorjgv was read at 13:01:58 on Feb. 1, 2012" is saved. Thus, "Osaki.jpg" is displayed in the image 14221.

As a result, the item display operation is completed. According to the present embodiment, at the time of reading, of the multi-tag 2, the portable terminal 1 side can automatically distinguish the necessity of download of the tag reading application 113 and then, on the basis of the contents written in the TXT region 222 in the multi-tag 2, perform guiding to an appropriate service server.

Second Embodiment

In a second embodiment, the terminal side is constructed capable of automatically distinguishing the necessity of download at the time of tag reading. Then, the portable terminal 1 is set up on the basis of the contents written in the tag.

FIG. 12 is a block diagram of an installation automatic guiding system according to the second embodiment of the present invention. An information display system according to the second embodiment of the present invention is described below with reference to FIG. 12. The information display system according to the present embodiment is different from the first embodiment in the points that the tag reading application 113 is replaced by a tag reading application 113A, that a setting section 114, a vibrator 17, an LED display section 18, and a speaker/microphone 19 are added, and that the spot search server 4 and the item search server 5 are deleted.

The tag reading application 113A receives from the Intent transfer section 111 a URI and a TXT message described in the multi-tag 2, then sets up the setting section 114 through the intent transfer section 111 with adopting as a key the contents described in the URI and the TXT having been received. Further, depending on the contents described in the URI and the TXT having been received, displaying of the website of the URI is requested to the browser 112 through the intent transfer section 111. Here, the tag reading application 113A is installed in the form of an application through the browser 112.

The setting section 114 receives an intent from the intent transfer section 111 and then performs setting of the ON/OFF of the vibrator 17, setting of the ON/OFF, the display color, and the luminance of the LED display section 18, setting of the sound volume of the speaker/microphone 19, and the like.

The vibrator 17 is a section for vibrating the portable terminal 1 and thereby notifying, to the user, arrival of a telephone call or a mall, completion of reading of a multi-tag 2, or the like. The ON/OFF, a vibration pattern, a vibration period, a vibration intensity, and the like can be set up through the setting section 114.

The LED display section 18 is a section for emitting light from the portable terminal 1 and thereby notifying, to the user, arrival of a telephone call or a mail, completion of reading of the multi-tag 2, or the like. The ON/OFF, a light emission pattern, a light emission period, a luminance, and the like can be set up through the setting section 114.

The speaker/microphone 19 is a section for emitting sound from the portable terminal 1 and thereby notifying, to the user, arrival of a telephone call or a mail, completion of reading of the multi-tag 2, or the like. The ON/OFF, a sound, generation pattern, a sound generation period, a sound volume, and the like can be set up through the setting section 114.

FIG. 13 is a flow chart showing processing of the tag reading application 113A in the processing section 11. When receiving an NDEF_DISCOVERED.URI intent from the intent transfer section 111, the tag reading application 113A starts processing. This intent contains a URI message (e.g., http://market.biglobe(registered trademark).jp/?id=jp.ne.biglobe(registered trademark).tagreader) and a TXT message (e.g., sound=off) (step S1131A).

When, in the URI message of the intent acquired at step S1131A, a download URI containing the application identifier of the own application is described, the procedure goes to step S1134A. When a download URI containing the application identifier of the own application is not described, the procedure goes to step S1133A. For example, in a case that the application identifier of the tag reading application 113 is jp.ne.biglobe(registered trademark).tagreader, when the character string of this application identifier is contained in the URI message, the procedure goes to step S1134A. When the character string is not contained, the procedure goes to step S1133A (step S1132A).

An ACTION_VIEW intent is transmitted to the intent transfer section so that the browser 112 is requested to open the URI described in the URI message (step S1133A).

A SETTINGS intent is transmitted to the intent transfer section 111 with adopting as a key the identifier described in the TXT region. For example, when a character siring "sound=off" is described in the TXT region, by using the SETTINGS intent, setting is performed on the setting section 114 such that sound is not emitted from the speaker/microphone 19 (step S1134A).

The setting operation using the present system is described below in detail with reference to FIG. 12. The installation operation for the tag reading application 113A is similar to the operation of the tag reading application 113 in the first embodiment. Thus, its explanation is omitted.

The present embodiment describes the operation that when the multi-tag 2 in which a setting command is described in the TXT region is read by using the portable terminal 1 at a time point posterior to installation of the tag reading application 113A, setting corresponding to the setting command described in the multi-tag 2 is performed.

In this example, it is premised that the application identifier of the tag reading application 113A is jp.ne.biglobe (registered trademark).tagreader. In the portable terminal 1, it is premised that the tag reading application 113A is already installed and that setting in the intent transfer section 111 is as shown in FIG. 3.

Further, it is premised that the download URI of the tag reading application 113 (http://market.biglobe(registered trademark).jp/?id=jp.ne.biglobe(registered trademark).tagreader) is set up in the URI region 221 in the multi-tag 2 and "sound=off" is set up into the TXT region 222.

It is premised that the contents shown in FIG. 8 are set up in the application DB 32. Further, it is premised feat a URL http://market.biglobe(registered trademark).jp is set up in the application distribution server 3.

When the multi-tag 2 is held over the portable terminal 1 so that communication is established between the short distance wireless transmission and reception section 12 in the portable terminal 1 and the short distance wireless transmission and reception section 21 in the multi-tag 2, the short distance wireless transmission and reception section 12 in the portable terminal 1 requests to the short distance wireless transmission and reception section 21 in the multi-tag 2 for transmission of the contents recorded in the storage section 22.

In response to the request from the short distance wireless transmission and reception section 12, the short distance wireless transmission and reception section 21 transmits to the short distance wireless transmission and reception section 12 the contents described in the URI region 221 and the TXT region 222 in the storage section 22. In this example, "http://market.biglobe(registered trademark).jp/?id=jp.ne.biglobe(registered trademark).tagreader" is transmitted as a URI and "sound-off" is transmitted as a TXT.

The short distance wireless transmission and reception section 12 transmits the URI and the TXT received from the short distance wireless transmission and reception section 21, as an NDEF_DISCOVERED.URI intent to the intent transfer section 111.

On receiving the NDEF_DISCOVERED.URI intent from the short distance wireless transmission and reception section 12, the intent transfer section 111 refers to the setting shown in FIG. 3 so as to determine a transfer destination for the intent. In this example, in accordance with the setting, the received NDEF_DISCOVERED.URI intent is transferred to the tag reading application 113A. When receiving the NDEF_DISCOVERED.URI intent from the intent transfer section 111, the tag reading application 113A starts processing.

In the URI message of the intent acquired at step S1131, a download URI (http://market.biglobe(registered trademark).jp/?id=jp.ne.biglobe(registered trademark).tagreader) containing the application identifier (jp.ne.biglobe(registered trademark).tagreader) of the own application is described. Thus, the tag reading application 113A reads the identifier described in the TXT region.

In this example, since "sound-off" is set up in the TXT region, a SETTINGS intent storing a message for setting up such that sound is not emitted from the speaker is transmitted to the intent transfer section 111.

The intent transfer section 111 receives the SETTINGS intent from the tag reading application 113A and then refers to the setting shown in FIG. 3 so as to determine a transfer destination for the intent. In this example, in accordance with the setting, the received SETTINGS intent is transferred to the setting section 114.

mprising:ng section 114 receives the intent in which the message SOUND=OFF is described, and then performs setting such that sound is not emitted from the speaker/microphone 19. As a result, the setting operation is completed.

The above-mentioned explanation has been given for an example that a setting command is described in the TXT region in the multi-tag 2 so that the setting command is performed to the setting section 114. Instead, a calling destination telephone number may be described in the TXT region and then the tag may be read so that a telephone call may be transmitted automatically.

Further, an SMS transmission destination telephone number may be described in the TXT region and then the tag may be read so that SMS may be transmitted automatically. Further, a name, a telephone number, and the like to be registered into a telephone directory may be described in the TXT region and then the tag may be read so that registration into the telephone directory may be achieved automatically.

According to the present embodiment at the time of reading of the multi-tag 2, the portable terminal 1 side can automatically distinguish the necessity of download of the tag reading application 113 and then, on the basis of the contents written in the TXT region 222 in the multi-tag 2, set up the portable terminal 1.

The above-mentioned embodiments may be applied to a check-in service that an NFC tag stuck in a store, a public facility, or the like is read with a portable terminal so that snot visiting is registered and a service that an NFC tag stuck on a product is read with a portable terminal so that a recipe of the product, the producer information, or the like is referred to. Further, the embodiments may be applied to a case that an NFC tag stuck in a bedroom, in an office, on an automobile, or the like is read with a portable terminal so that a manner mode, a drive mode, or the like is set up.

The present invention has been described above with reference to the embodiments. However, the present invention is not limited to the above-mentioned embodiments. Various changes understandable to the person skilled in the art within the scope of the present invention may be performed on the configurations and the details of the present invention. The above-mentioned embodiments may be combined with each other.

Next, a third embodiment of the present invention is described below. The third embodiment relates to a program of information display method in a portable terminal. The portable terminal 1 according to the present invention includes a processing section 11 (a "computer") (see FIG. 1) and a program storage section (not shown). The program storage section stores a program of information display method in a portable terminal represented in the flow charts of FIGS. 11 and 13.

The processing section 11 (the "computer") reads the program from the program storage section and then, in accordance with the program, controls the display section 14, the input section 15, the communication section 13, and the storage section 16. The contents of control are already described and hence the explanation is omitted here.

As described above, according to the present invention a program of information display method in a portable terminal is obtained in which two sheets of two-dimensional bar code for download and for individual information data reading need not be installed and hence an installation space can be reduced and a user need not select which bar code is to be read.

A part or all of the above-mentioned embodiments may be described also as the following additional notes, which are not restrictive.

(Additional note 1) A portable terminal wherein a transfer destination for a message of a read-out multi-tag is set to be a different destination depending on whether a tag reading application has been installed in the own terminal and wherein, in the service server DB, the URI of a WEB server corresponding to a service identifier is saved in an installation package of the tag reading application and the URI of the WEB server corresponding to the service identifier is set Up at the time of installation of the tag reading application.

(Additional note 2) The portable terminal according to additional note 1, comprising storage means of storing the service server DB, wherein the service server DB stores a plurality of access destinations corresponding to service identifiers contained in the text sentence.

(Additional note 3) The portable terminal according to additional note 1 or 2, wherein the multi-tag includes: a URI region for recording a uniform resource identifier (URI) identifying a server resource or the like; and a text region describing a service identifier and a parameter necessary for a service.

(Additional note 4) An information display system comprising: a multi-tag; and a portable terminal for, depending on whether a tag reading application has been installed in the own terminal, setting to be a different destination a transfer destination for a message of a read-out multi-tag, wherein a service server DB (Data Base) is provided for returning an URI of a WEB server in accordance with a service identifier contained in the text sentence, and wherein when the URI contained in the message received from the intent transfer means is the URI of an application distribution server, the tag reading application searches the service server DB with adopting as a key the service identifier described in the text sentence contained in the message received from the intent transfer means and thereby obtains necessary information from the WEB server obtained as a result of the search.

(Additional note 5) The information display system according to additional note 4, wherein in the service server DB, the URI of a WEB server corresponding to a service identifier is saved in an installation package of the tag reading application and the URI of the WEB server corresponding to the service identifier is set up at the time of installation of the tag reading application.

(Additional note 6) The information display system according to additional note 4 or 5, comprising storage means of storing the service server DB, wherein the service server DB stores a plurality of access destinations corresponding to service identifiers contained in the text sentence.

(Additional note 7) The information display system according to any one of additional notes 4 to 6, wherein the multi-tag includes: a URI region for recording a uniform resource identifier (URI) identifying a server resource or the like; and a text region describing a service identifier and a parameter necessary for a service.

(Additional note 8) An information display method of a portable terminal, wherein a transfer destination for a message of a read-out multi-tag is set to be a different destination depending on whether a tag reading application has been installed in the own terminal and wherein, in the service server DB, the URI of a WEB server corresponding to a service identifier is saved in an installation package of the tag reading application and the URI of the WEB server corresponding to the service identifier is set up at the time of installation of the tag reading application.

(Additional note 9) The information display method according to additional note 8, comprising storage means of storing the service server DB, wherein the service server DB stores a plurality of access destinations corresponding to service identifiers contained in the text sentence.

(Additional note 10) The information display method according to additional note 8 or 9, wherein the multi-tag includes: a URI region for recording a uniform resource identifier (URI) identifying a server resource or the like; and a text region describing a service identifier and a parameter necessary for a service.

(Additional note 11) A non-transitory computer readable medium storing a program of information display method for causing a computer of a portable terminal to execute a step of, in a state that a transfer destination for a message of a read-out multi-tag is set up in advance, transferring the message to a different transfer destination depending on whether a tag reading application has been installed in the own terminal, the program comprising: an intent transfer step of, on the basis of the setting, transferring the message read from the multi-tag to a browser or the tag reading application; a browser for receiving and installing an installation package of an application from an application distribution server specified by a URI (Uniform Resource Identifier) contained in the message received at the intent transfer step; and a tag reading, application for, on the basis of a URI and a text sentence contained in the message received from the intent transfer means, determining a WEB server serving as a communication counterpart and then displaying data acquired from the WEB server, wherein the intern transfer step, when the tag reading application is not yet installed, transfers to the browser the message read from the multi-tag and, when the tag reading application is already installed, transfers to the tag reading application the message read from the multi-tag.

(Additional note 12) The non-transitory computer readable medium storing a program according to additional note 11, comprising a service server DB (Data Base) for, in accordance with a service identifier contained in the text sentence, returning an URI of a WEB server, wherein when the URI contained in the message received from the intent transfer means is a URI of an application distribution server, the tag reading application searches the service server DB with adopting as a key-file service identifier described in the text sentence contained in the message received from the intent transfer means and thereby obtains necessary information from the WEB server obtained as a result of the search.

(Additional note 13) The non-transitory computer readable medium storing a program according to additional note 12, wherein in the service server DB, the URI of the WEB server corresponding to the service identifier is saved in an installation package of the tag reading application and the URI of the WEB server corresponding to the service identifier is set up at the time of installation of the tag reading application.

(Additional note 14) The non-transitory computer readable medium storing a program according to additional note 12 or 13, comprising storage means of storing the service server DB, wherein the service server DB stores a plurality of access destinations corresponding to service identifiers contained in the text sentence.

(Additional note 15) The non-transitory computer readable medium storing a program according to any one of additional notes 11 to 14, wherein the multi-tag includes: a URI region for recording a uniform resource identifier (URI)

identifying a server resource or the like; and a text region describing a service identifier and a parameter necessary for a service.

The above-mentioned embodiments have been described with premising that the present invention provides a hardware configuration. However, the present invention is net limited to this. The present invention may be implemented by an approach that arbitrary processing is performed by a computer program executed by a CPU (Central Processing Unit).

Further, the above-mentioned program may be stored in a non-transitory computer readable medium of diverse kind and then provided to a computer. The non-transitory computer readable medium includes a tangible recording medium of diverse kind. Examples of the non-transitory computer readable medium include a magnetic recording medium (e.g., a flexible disc, a magnetic tape, and a hard disc drive), a magneto-optical recording medium (e.g., a magneto-optical disc), a CD-ROM (Read Only Memory), a CD-R, a CD-R/W, a semiconductor memory (e.g., a mask ROM, a PROM (Programmable ROM), an EPROM (Erasable PROM), a flash the ROM, and a RAM (Random Access Memory). Further, the program may be provided from a transitory computer readable medium of diverse kind to a computer. Examples of the transitory computer readable medium include an electric signal, an optical signal, and electromagnetic waves. The transitory computer readable medium can provide a program to a computer through a cable communication path such as an electric wire and an optical fiber or alternatively through a wireless communication path.

The invention of the present application has been described above with reference to the embodiments. However, the invention of the present application is not limited to the above-mentioned embodiments. Various changes understandable to the person skilled in the art within the scope of the invention may be performed on the configurations and the details of the invention of the present application.

This application is based upon and claims the benefit of priority from Japanese patent application No. 2012-072666, filed on Mar. 28, 2012, the disclosure of which is incorporated herein its entirety by reference.

DESCRIPTION OF REFERENCE NUMERALS

1 Portable terminal
2 Multi-tag
3 Application distribution server
4 Spot search server
5 Item search server
11 Processing section
12 Short distance wireless transmission and reception section
13 Communication section
14 Display section
15 Input section
16 Storage section
17 Vibrator
18 LED display section
19 Speaker/microphone
21 Short distance wireless transmission and reception section
22 Storage section
31 WEB server
32 Application DB
41 WEB server
42 Spot DB
51 WEB server
52 Item DB
111 Intent transfer section
112 Browser
113 Tag reading application
113A Tag reading application
114 Setting section
141 Installation screen
142 Item search result screen
161 Service server DB
162 Reading history DB
221 URI region
222 TXT region
321 Application identifier
322 File
421 Spot ID
422 Spot name
423 Latitude
424 Longitude
425 Explanation
426 Image
521 Item ID
522 Item name
523 Explanation
524 Image
1111 Order of priority
1112 Intent name
1113 Transfer destination
1411 Title
1412 Icon
1413 Installation button
1414 Explanation
1421 Read-out item
1422 Reading history
1611 Service identifier
1612 Access destination
1621 Reading date and time
1622 Service identifier
1623 ID
1624 Name
1625 Latitude
1626 Longitude
1627 Explanation
1628 Image
14211 Image
14212 Item name
14213 Item explanation
14221 Image
14222 Image
14223 Image
14224 Image
14225 Image
14226 Image

The invention claimed is:

1. A portable terminal comprising:
a processor configured to transfer a message read from a multi-tag to a browser or tag reading application on the basis of setting;
a browser configured to receive and install an installation package of an application from an application distribution server specified by a URI (Uniform Resource Identifier) contained in the message received from the processor; and
a tag reading application configured to determine whether to use the browser based on the URI and text contained in the message received from the processor, wherein a transfer destination for the message of a read-out of the multitag is set to be a different destination depending on whether a tag reading application has been installed in the portable terminal;

wherein the processor is configured to transfer the message read from the multi-tag to the browser when the tag reading application is not yet installed; and wherein the processor is configured to transfer the message read from the multi-tag to the tag reading application when the tag reading application is already installed; and wherein the processor is configured to change an operational setting of the portable terminal based on the content of the message read.

2. The portable terminal according to claim 1 comprising:

a Data Base configured to return a URI in accordance with a service identifier contained in the text, wherein the tag reading application is configured to search the database using a service identifier described in the text as a key.

3. An information display system comprising:

a multi-tag; and a portable terminal comprising a processor;

a browser configured to receive and install an installation package of an application from an application distribution server specified by a URI (Uniform Resource Identifier) contained in the message received from the processor;

wherein the portable terminal is configured to transfer a message of a read-out multi-tag to a different destination depending on whether a tag reading application has been installed in the portable terminal;

wherein the processor is configured to change an operational setting of the portable terminal based on the content of the message read.

4. The information display system according to claim 3 comprising:

a processor configured to transfer a message read from the multi-tag to a browser or the tag reading application on the basis of setting;

a browser configured to receive and install an installation package of an application from an application distribution server specified by a URI (Uniform Resource Identifier) contained in the message received from the processor; and a tag reading application configured to determine whether to use the URI and text contained in the message received from the processor, wherein the tag reading application is configured to use a web server as a communication counterpart before displaying data acquired from the web server;

wherein the processor is configured to, transfer to the browser the message read from the multi-tag to the web server when the tag reading application is not yet installed and, wherein the processor is configured to transfer the message read from the multi-tag to the tag reading application.

5. An information display method for a portable terminal, the method comprising:

using a browser for receiving and installing an installation package of an application from an application distribution server specified by a URI (Uniform Resource Identifier) contained in a message received from a processor;

wherein a transfer destination for a read message of a read-out multi-tag is set to be a different destination depending on whether a tag reading application has been installed in the portable terminal; and wherein a processor is configured to change an operational setting of the portable terminal based on the content of the read message.

6. The information display method according to claim 5 further comprising the steps of:

using a processor for transferring a message read from the multitag, to a browser or the tag reading application on the basis of the setting;

using a tag reading application relying on a URI and text contained in the processor message, to determine whether to use a web server serving as a communication counterpart and displaying data acquired from the web server, wherein the processor is configured to transfer the message read from the multi-tag to the web server when the tag reading application is not yet installed; and wherein the processor is configured to transfer the message read from the multi-tag to the tag reading application when the tag reading application is already installed.

7. The information display method according to claim 6 further comprising the steps of:

using a Data Base configured to return a URI from a web server in accordance with a service identifier contained in text, wherein the tag reading application is configured to search the database using a service identifier described in the text as a key.

8. A non-transitory computer readable medium storing a program of information display method for causing a computer of a portable terminal to execute the steps of, depending on whether a tag reading application has been installed in the portable terminal, setting to be a different destination a transfer destination for a message of a read-out multi-tag;

using a browser for receiving and installing an installation package of an application from an application distribution server specified by a URI (Uniform Resource Identifier) contained in a message received from a processor;

wherein the processor is configured to change an operational setting of the portable terminal based on the content of the message read.

9. The portable terminal according to claim 1 wherein the processor is configured, as to change the operational setting, to determine a web server which becomes the partner of the communication, and displays the data acquired from the web server.

* * * * *